(12) United States Patent
Okamura et al.

(10) Patent No.: US 10,457,807 B2
(45) Date of Patent: Oct. 29, 2019

(54) COMPOSITE RESIN MATERIAL, DIELECTRIC FILM, AND FILM CAPACITOR AND COMBINATION TYPE CAPACITOR EMPLOYING SAME, INVERTER, AND ELECTRIC VEHICLE

(71) Applicant: KYOCERA Corporation, Kyoto-shi, Kyoto (JP)

(72) Inventors: Kouki Okamura, Kyoto (JP); Kazuki Imagawa, Daito (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/580,211

(22) PCT Filed: Jun. 10, 2016

(86) PCT No.: PCT/JP2016/067336
§ 371 (c)(1),
(2) Date: Dec. 6, 2017

(87) PCT Pub. No.: WO2016/199886
PCT Pub. Date: Dec. 15, 2016

(65) Prior Publication Data
US 2018/0148574 A1    May 31, 2018

(30) Foreign Application Priority Data

Jun. 11, 2015 (JP) .................................. 2015-118447
Jul. 29, 2015 (JP) .................................. 2015-149738

(51) Int. Cl.
C09D 129/10    (2006.01)
C08L 71/12     (2006.01)
(Continued)

(52) U.S. Cl.
CPC .............. *C08L 71/123* (2013.01); *B60L 50/51* (2019.02); *C08G 65/002* (2013.01); *C08J 5/18* (2013.01);
(Continued)

(58) Field of Classification Search
CPC .. B60L 11/1803; B60L 2210/40; C08L 71/12; C08L 2203/20; C08L 67/02;
(Continued)

(56) References Cited

U.S. PATENT DOCUMENTS 5,112,914 A    5/1992 Mizuno et al.
5,116,906 A    5/1992 Mizuno et al.
(Continued)

FOREIGN PATENT DOCUMENTS

EP    0381391 A2    8/1990
JP    02-202540 A    8/1990
(Continued)

OTHER PUBLICATIONS

Tachikawa Koji, Yokoe Makihito, Yamanaka Toru, Matsubara Tomoshi, Thermoplastic Resin Composition and Method for Producing the Same: JP2007-146123 (Year: 2007).*
(Continued)

*Primary Examiner* — Muhammad S Islam
(74) *Attorney, Agent, or Firm* — Volpe and Koenig, P.C.

(57) ABSTRACT

A composite resin material including: a first organic resin having a phenylene ether structure; and a second organic resin having a main skeleton composed of a polyester structure, one of the first organic resin and the second organic resin forming a continuous phase, the other one thereof being present within the continuous phase, as organic resin particles having an average particle diameter of 1 μm or less.

19 Claims, 4 Drawing Sheets

(51) Int. Cl.

| | |
|---|---|
| *C08J 5/18* | (2006.01) |
| *C08L 67/02* | (2006.01) |
| *H01G 4/18* | (2006.01) |
| *H02M 7/48* | (2007.01) |
| *H01G 4/14* | (2006.01) |
| *H01G 4/228* | (2006.01) |
| *H01G 4/33* | (2006.01) |
| *H01G 4/38* | (2006.01) |
| *H01G 4/40* | (2006.01) |
| *H02M 7/5387* | (2007.01) |
| *H02P 27/06* | (2006.01) |
| *C08G 65/00* | (2006.01) |
| *B60L 50/51* | (2019.01) |

(52) U.S. Cl.
CPC ............ *C08L 67/02* (2013.01); *C08L 71/12* (2013.01); *H01G 4/14* (2013.01); *H01G 4/18* (2013.01); *H01G 4/228* (2013.01); *H01G 4/33* (2013.01); *H01G 4/38* (2013.01); *H01G 4/40* (2013.01); *H02M 7/48* (2013.01); *H02M 7/5387* (2013.01); *H02P 27/06* (2013.01); *B60L 2210/40* (2013.01); *C08J 2367/02* (2013.01); *C08J 2371/12* (2013.01); *C08J 2467/02* (2013.01); *C08J 2471/12* (2013.01); *C08L 2203/20* (2013.01)

(58) Field of Classification Search
CPC ............ H01G 4/14; H01G 4/18; H01G 4/228; H01G 4/33; H01G 4/38; H01G 4/40; H02M 7/48; H02M 7/5387; C08J 2367/02; C08J 2371/12; C08J 2467/02
See application file for complete search history.

(56) References Cited

U.S. PATENT DOCUMENTS

| | | | |
|---|---|---|---|
| 5,189,099 | A | 2/1993 | Arnold-Mauer et al. |
| 6,166,937 | A * | 12/2000 | Yamamura ............ H01L 23/473 |
| | | | 257/E23.098 |
| 2014/0376154 | A1* | 12/2014 | Takeoka ................ H01G 4/015 |
| | | | 361/301.4 |

FOREIGN PATENT DOCUMENTS

| | | |
|---|---|---|
| JP | 02-242848 A | 9/1990 |
| JP | 04-252260 A | 9/1992 |
| JP | 09-129475 A | 5/1997 |
| JP | 10-139984 A | 5/1998 |
| JP | 2003-082218 A | 3/2003 |
| JP | 2007-146123 A | 6/2007 |
| JP | 2008-291233 A | 12/2008 |
| JP | 2009-067928 A | 4/2009 |
| WO | 2016/104398 A1 | 6/2016 |

OTHER PUBLICATIONS

Kurihara Tetsuo, Kamo Hiroshi : Resin Composition: JP 2008-291233 (Year: 2008).*
International Search Report, PCT/JP2016/067336, dated Sep. 6, 2016, 4 pgs.
Mori, T,. et al., "High-field Conduction and Breakdown against Physical and Chemical Properties for Low Density Polyethylene Films above Room Temperature: Effects of types of Carbonyl Group and Crystallization Temperature," IEEJ Transactions on Fundamentals and Materials, 118, (1998), pp. 1145-1151 (Partial English Translation included).

* cited by examiner

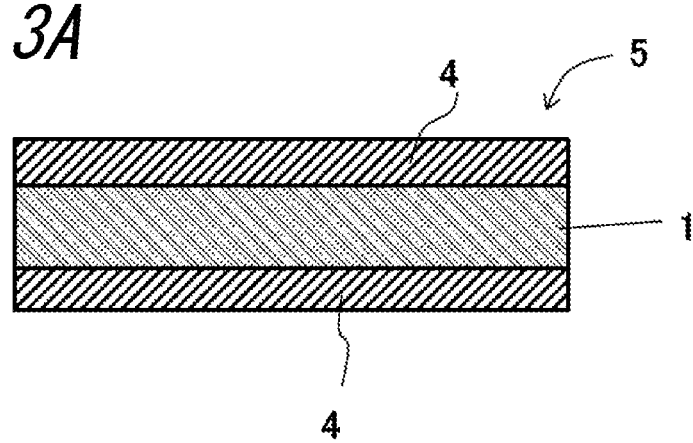
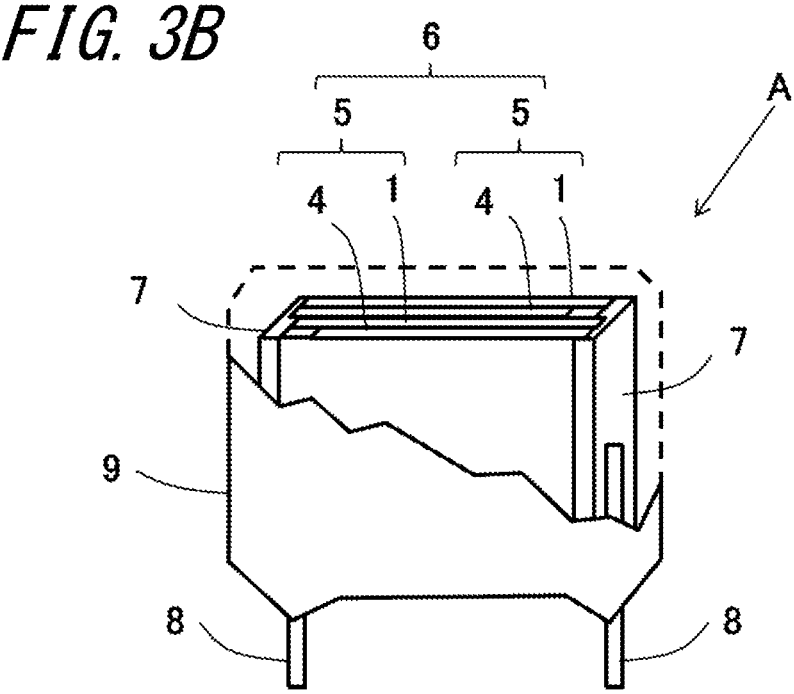

ether structure; and a second organic resin having a main skeleton composed of a polyester structure, one of the first organic resin and the second organic resin forming a continuous phase, the other one thereof being present within the continuous phase, as organic resin particles having an average particle diameter of 1 μm or less.

A dielectric film of the present disclosure comprises the above-mentioned composite resin material.

A film capacitor of the present disclosure includes: a body member comprising a wound body or stacked body of a metallized film in which a metal film is disposed on the above-mentioned dielectric film; and an external electrode disposed on the body member.

A combination type capacitor of the present disclosure includes: a plurality of the above-mentioned film capacitors; and at least one bus bar connecting all of the plurality of the film capacitors.

An inverter of the present disclosure includes: a bridge circuit including switching elements; and a capacitance member connected to the bridge circuit, the capacitance member including the above-mentioned film capacitor or combination type capacitor.

An electric vehicle of the present disclosure includes: a power supply; an inverter connected to the power supply; an electric motor connected to the inverter; and wheels driven by the electric motor, the inverter being the above-mentioned inverter.

COMPOSITE RESIN MATERIAL, DIELECTRIC FILM, AND FILM CAPACITOR AND COMBINATION TYPE CAPACITOR EMPLOYING SAME, INVERTER, AND ELECTRIC VEHICLE

TECHNICAL FIELD

The present invention relates to a composite resin material, a dielectric film, and a film capacitor and a combination type capacitor employing the same, an inverter, and an electric vehicle.

BACKGROUND ART

For example, a film capacitor is constructed of a dielectric film of polypropylene resin in film-like form having a vapor-deposited metallic membrane on its surface as an electrode. With this construction, in the event of electrical short-circuiting in an insulation defective area of the dielectric film, the metallic membrane located around the defective area is vaporized for release under short-circuiting-induced energy, causing electrical insulation, with the consequence advantage to prevent dielectric breakdown of the film capacitor (for example, refer to Patent Literature 1).

The film capacitor is hence capable of preventing ignition and electric shock entailed by electrical short-circuiting in an electric circuit. The film capacitor, being noteworthy for such a capability, in recent years, has been put to an increasingly wider range of applications, including application to a power circuit of LED (Light Emitting Diode) illumination (for example, refer to Patent Literature 2).

However, on a substrate on which various electronic components are mounted, the film capacitor still has a large size as compared with other electronic component such as a ceramic capacitor. For the purpose of accomplishment of low-profile design and higher packaging density of the substrate, studies have been carried out on development of a smaller version of the film capacitor.

Further, in association with size reduction of electronic equipment, and capacity enhancement of capacitors, and the like, operating environments are becoming a high temperature. Film capacitors are required to have a heat resistance so that stable electrical characteristics may be obtained over a long time even under such conditions.

Employable means for size reduction of a film capacitor includes: layer thickness reduction of the dielectric film; and reduction of the number of stacked layers or the number of winding turns of the dielectric film.

For example, in materials such as polyphenylene ether (PPE) good in the heat resistance and the electrical characteristics, layer thickness reduction is achieved by being mixed with other resins so as to be used as a resin composition material (for example, see Patent Literature 2).

CITATION LIST

Patent Literature

Patent Literature 1: Japanese Unexamined Patent Publication JP-A H9-129475 (1997)
Patent Literature 2: Japanese Unexamined Patent Publication JP-A 2009-67928

SUMMARY OF INVENTION

A composite resin material of the present disclosure includes: a first organic resin having a phenylene ether

BRIEF DESCRIPTION OF DRAWINGS

FIG. 3A is a sectional view schematically showing a structure that a metal film is disposed on a surface of a dielectric film, and FIG. 3B is an external appearance perspective view showing a film capacitor according to a first embodiment;

DESCRIPTION OF EMBODIMENTS

A composite resin material of the present embodiment comprises a first organic resin and a second organic resin. The first organic resin has a phenylene ether structure and the second organic resin has a main skeleton composed of a polyester bond.

The first organic resin having a phenylene ether structure is good in the insulating property. The second organic resin having a main skeleton composed of a polyester bond is good in the relative permittivity and the impact resistance. Further, both organic resins have a high heat resistance. The composite resin material of the present embodiment comprises the first organic resin and the second organic resin so as to become good in the balance of various characteristics such as the mechanical properties (such as the impact resistance), the heat resistance, the dielectric characteristics (the relative permittivity), the insulating property, and the like.

The first organic resin having a phenylene ether structure is an organic resin having a relatively low relative permittivity and hence a low polarity (e.g., the relative permittivity of polyphenylene ether is 2.6). On the other hand, the second organic resin having a main skeleton composed of a polyester bond is an organic resin having a relatively high relative permittivity, that is, a high polarity (e.g., the relative permittivity of polyarylate is 3.2). When the first organic resin and the second organic resin are mixed together into a composite form, a composite resin material is obtained that has both the good insulating property of the first organic resin and the high relative permittivity of the second organic resin.

Figure 1:
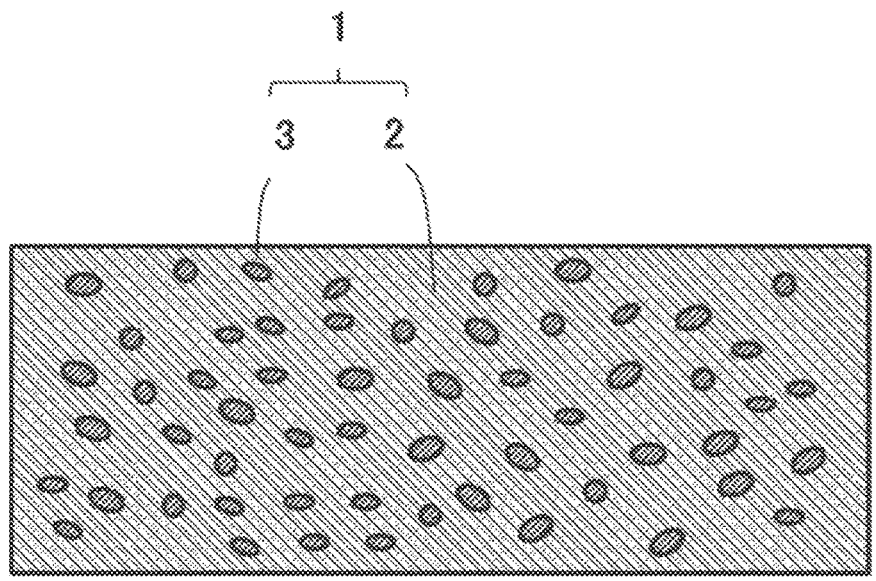
FIG. 1 is a sectional view schematically showing one embodiment of a composite resin material.

As shown in FIG. 1, in the composite resin material 1 of the present embodiment, one of the first organic resin and the second organic resin forms a continuous phase 2 of the composite resin material 1 and the other one thereof is present within the continuous phase 2, as organic resin particles 3 having an average particle diameter of 1 µm or less.

Here, the continuous phase indicates a state where its entirety is connected to each other in a dispersed system, that is, a state taken by a medium or a dispersion medium. Then, within this, another substance is dispersed as a dispersoid having a particle form.

Figure 2:
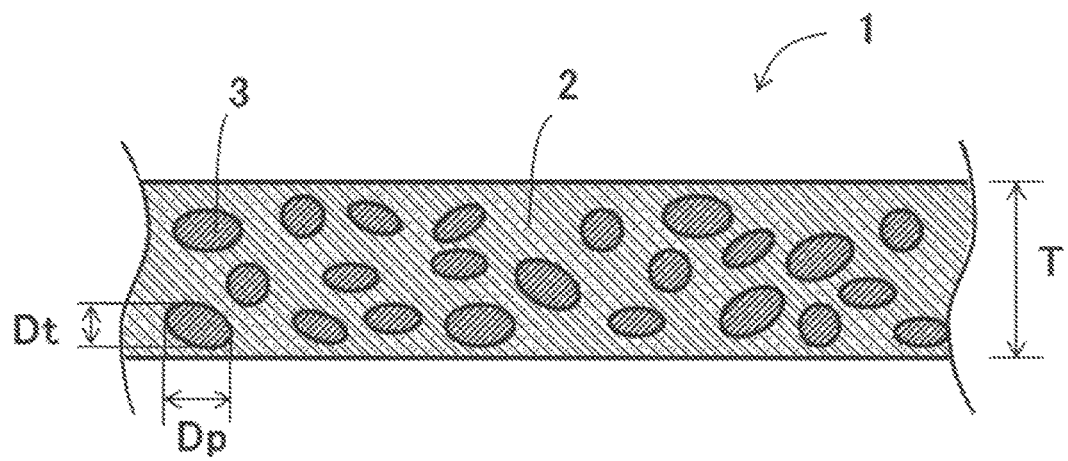
FIG. 2 is a sectional view schematically showing one embodiment of a film-shaped composite resin material.

As such, within the continuous phase 2 composed of one organic resin, the other organic resin is present as the small organic resin particles 3 of 1 µm or less, so that the organic resin particles 3 are homogeneously dispersed in the composite resin material 1. For example, the composite resin material 1 can be formed as a thin layer film as shown in FIG. 2, whose variation in the thickness T, or surface roughness is small. For example the average surface roughness Sa is 50 nm or less, the maximum height Sz is 500 nm or less, and the ten-point average roughness SzJIS is 350 nm or less.

As such, when the composite resin material 1 is used, for example, as a thin layer film or a coating film (simply referred to as a film, in some cases hereinafter), the variation in the thickness (T), or surface roughness of the thin layer film or the coating film can be reduced. Thus, in the film employing the composite resin material 1, the film is uniformly dense, the variation in various characteristics is small, and an good insulating property is obtained.

Such advantageous effects become remarkable, especially in a case where the thickness (T) of the film is 5 µm or less. In particular, it is preferable that the average particle diameter of the organic resin particles 3 is 500 nm (0.5 µm) or less.

The organic resin particles 3 may have any shape selected from a spherical shape, an ellipsoidal shape, a disk shape, a cylindrical shape, a stratified shape, an irregular, and the like. In particular, a spherical shape and an ellipsoidal shape are preferable, that is, it is preferable that a circular shape or an elliptic shape appears in the surface or the cross section of the composite resin material 1. When the organic resin particles 3 have a spherical shape or an ellipsoidal shape, the organic resin particles 3 can homogeneously be dispersed in the continuous phase 2.

For example, in the film-shaped composite resin material 1 as shown in FIG. 2, the length Dp of the organic resin particle 3 in the planar direction may be 1.0 to 2.0 times the length Dt in the film thickness direction. That is, in a cross section of the film, each organic resin particle 3 may have a circular shape or a flattened shape whose length Dp in the film planar direction is larger than the length Dt in the thickness direction and the aspect ratio (Dp/Dt) may be 2.0 or less. When the average particle diameter of the organic resin particles 3 relative to the thickness T of the film is as large as, for example, 7% or more, it is difficult to realize a state where the organic resin particles 3 are homogeneously dispersed in the continuous phase 2 of the film. In such a case, when the aspect ratio Dp/Dt of the organic resin particles 3 is set to 2.0 or less, the organic resin particles 3 can more homogeneously be dispersed in the continuous phase 2.

As for the ratio between the first organic resin and the second organic resin, it is preferable that the second organic resin is in an amount falling within a range of 1 to 75 parts by mass relative to the total amount of 100 parts by mass of the first organic resin and the second organic resin. When such a range is adopted, the composite resin material 1 is obtained that is remarkably good in the balance between various characteristics such as the heat resistance, the mechanical properties (the impact resistance), the dielectric characteristics (the relative permittivity), and the insulating property (the breakdown electric field).

Further, in the composite resin material 1, when the first organic resin is adopted as the continuous phase 2 and the second organic resin is adopted as the organic resin particles 3, so that the organic resin particles 3 are dispersed in the continuous phase 2, that is, the second organic resin is dispersed in the first organic resin, degradation in the insulating property under a high electric field can be suppressed (the lifetime is improved).

As described above, the first organic resin has a low polarity and the second organic resin has a high polarity. Then, for example, it is known that when a remarkably small amount of a compound having a polar group such as an ester bond is added to low density polyethylene having a low polarity, the current value flowing through the low density polyethylene under a high electric field is suppressed (see IEEJ Transactions on Fundamentals and Materials, 118, pp. 1145-1151 (1998)). This is because the electric charge moving within the low density polyethylene is trapped by the C=O part of the ester bond (simply referred to as a charge trap effect, in some cases hereinafter). As such, it is understood that the conduction current in the organic resin under the high electric field is suppressed so that degradation in the insulating property of the organic resin is suppressed (the lifetime characteristics are improved).

For example, when the dispersibility of the second organic resin having a high polarity to the first organic resin having a low polarity is improved so that a state is realized that the organic resin particles 3 of the second organic resin are dispersed in the first organic resin (the continuous phase 2), the above-mentioned effect of suppressing the insulating property degradation is obtained.

It is preferable that the average particle diameter of the organic resin particles 3 serving as the second organic resin is 300 nm or less. When the second organic resin (the organic resin particles 3) having an average particle diameter of 300 nm or less is dispersed in the first organic resin (the continuous phase 2), degradation in the insulating property of the composite resin material is suppressed further (the lifetime characteristics are improved further). It is considered that this is because the second organic resin (the organic resin particles 3) whose average particle diameter is as small as 300 nm or less is dispersed in the first organic resin (the continuous phase 2), and therefore the above-mentioned charge trap effect is enhanced.

The texture structure in which the organic resin particles 3 of the other one of the organic resins is dispersed in the continuous phase 2 composed of the one of the organic resins as described here and the average particle diameter and the shape of the organic resin particles 3 can be checked by a observing the surface or the cross section of the composite resin material by using a scanning transmission microscope (STEM). Further, the variation in the thickness T of the film-shaped composite resin material can be checked by film thickness measurement employing a contact type film thickness measuring instrument or by surface roughness measurement using an atomic force microscope (AFM).

The composite resin material 1 may further contain a metallic element. When the metallic element is dispersed in the composite resin material 1, degradation in the insulating property of the composite resin material 1 can be suppressed further. When the metallic element is dispersed in the composite resin material 1, similarly to the case where the above-mentioned polar group is introduced, by virtue of the introduction of the metallic element, the electric charge moving within the composite resin material 1 is trapped by the metallic element so that degradation in the insulating property of the composite resin material 1 is suppressed.

The content of the metallic element in the composite resin material 1 may be set to 0.01 to 1.0 mass %. When the metallic element contained in the composite resin material 1 is set to 0.01 mass % or higher, the electric charge can effectively be trapped. Further, when the value is 1.0 mass % or lower, an effect of suppressing the hopping of the electric charge between the metallic elements.

For example, employable metallic elements to be contained in the composite resin material 1 include Mg, Si, Ti, Zr, Fe, Cu, Sn, Al, Ge, Ta, and W. In particular, it is preferable to contain at least one selected from Mg, Ti, Zr, and Al, or two or more of metallic elements may be contained in the composite resin material 1. The kind and the content of each metallic element contained in the composite resin material 1 can be checked, for example, by high-frequency inductively coupled plasma (ICP) emission spectral analysis.

For example, the metallic element may be contained as a metal oxide filler in the composite resin material 1. Further, for example, the composite resin material 1 may be prepared so that a metal alkoxide is mixed into the first organic resin and/or the second organic resin.

In the case of the composite resin material 1 containing a metal alkoxide, the second organic resin may contain an alkoxy group.

In general, an organic resin having a high polarity is less prone to be dispersed in an organic resin having a low polarity. Then, when an alkoxy group having a low polarity is contained in the second organic resin having a high polarity, the polarity of the second organic resin decreases so that dispersion into the first organic resin becomes easy. In particular, when the alkoxy group is bound to the main skeleton of the second organic resin, the polarity of the second organic resin decreases further so that dispersion into the first organic resin becomes easy.

The main skeleton of the second organic resin and the alkoxy group may be bound together by an ester bond. In general, when the polymer of an organic resin reacts with a metal alkoxide, the functional groups of the polymer and the metal alkoxide perform hydrolysis and polycondensation so as to be bridged together so that an organic resin whose intramolecular main skeleton has a metal alkoxide group is obtained. Nevertheless, when a metallic element is introduced into the main skeleton of the second organic resin as described here, in some cases, the good heat resistance, mechanical properties, electrical properties, and the like of the second organic resin are degraded.

On the other hand, when an alkoxy group generated by decomposition of a metal alkoxide is bound to the second organic resin, the main skeleton of the second organic resin does not contain a metallic element. Thus, the good heat resistance, mechanical properties, and electrical properties of the second organic resin are maintained. In this case, the main skeleton of the second organic resin and the alkoxy group are bound together by an ester bond.

It is preferable that the content of the alkoxy group in the second organic resin is 3% to 30%, more preferably 10% to 25%, or particularly 10% to 20%, in terms of molar ratio relative to the entire ester bonds contained in the composite resin material 1, that is, the entire ester bonds present in the second organic resin. When the content of the alkoxy group contained in the composite resin material 1 is set to fall within such a range, in a state where the heat resistance and the mechanical characteristics of the second organic resin are maintained, the conduction current of the second organic resin itself under a high electric field can be suppressed so that degradation in the insulating property can be suppressed further (the lifetime characteristics can be improved).

When the second organic resin contains an alkoxy group, as for the ratio between the first organic resin and the second organic resin, it is preferable that the second organic resin is in an amount falling within a range of 1 to 30 parts by mass relative to the total amount of 100 parts by mass of the first organic resin and the second organic resin. When the fraction of the second organic resin is set to 1 part by mass or greater and 30 parts by mass or less, the second organic resin can satisfactorily be dispersed as the organic resin particles 3 having an appropriate particle diameter in the continuous phase 2 formed by the first organic resin, so that the electric charge can effectively be trapped.

The resin components such as the first organic resin and the second organic resin contained in the composite resin material 1 can be analyzed and checked by nuclear magnetic resonance spectroscopy (NMR).

The binding state between the second organic resin and the alkoxy group and the content of the alkoxy group in the composite resin material 1 (the molar ratio of the alkoxy group relative to the entire ester bonds present in the second organic resin) can be checked by nuclear magnetic resonance spectroscopy (NMR). Specifically, the binding state can be checked by performing $^1$H-NMR (proton NMR) measurement, $^{13}$C-NMR measurement, and HMQC (Heteronuclear Multiple Quantum Coherence) measurement and HMBC (Heteronuclear Multiple Bond Connectivity) measurement in two-dimensional correlation NMR spectroscopy.

For example, the composite resin material 1 of the present embodiment can be obtained as follows. The first organic resin and the second organic resin are each dissolved into an organic solvent to prepare a first resin solution and a second resin solution. The second resin solution prepared here is referred to as a second resin solution A1.

The first resin solution and the second resin solution A1 having been prepared are mixed together so that the first organic resin and the second organic resin may become a desired ratio. Then, agitation is performed for 24 hours or longer to obtain a mixed resin solution A2.

In a case where a metal oxide filler (simply referred to as a filler, in some cases hereinafter) is mixed, the filler is dispersed in an organic solvent to prepare a filler dispersion liquid B1. Then, the obtained filler dispersion liquid and the above-mentioned mixed resin solution A2 are mixed together so that a predetermined ratio may be achieved. Then, agitation is performed for 24 hours or longer to obtain a mixed resin solution B2.

In a case where a metal alkoxide is mixed, the metal alkoxide is dissolved into an organic solvent to prepare a metal alkoxide solution. Then, in a dry atmosphere (e.g., in air, nitrogen, or the like having a dew point of −50° C. or lower), the prepared metal alkoxide solution and the above-mentioned second resin solution A1 are mixed together in a predetermined ratio and then agitation is performed for 24 hours or longer. Since these processes are performed in the dry atmosphere, the ester bond of the second organic resin can be reacted with the metal alkoxide while hydrolysis of the metal alkoxide is suppressed. That is, the metal alkoxide causes the ester bond of the second organic resin to dissociate and then the alkoxy group of the metal alkoxide is bound to the portion of the dissociated ester bond by an addition reaction. By virtue of this reaction, a second resin solution C1 is obtained which contains the second organic resin in which the alkoxy group has been bound to the main skeleton thereof composed of a polyester structure; and the metallic element.

Further, the first resin solution and the second resin solution C1 are mixed together in a predetermined ratio and then agitation is performed for 24 hour or longer to obtain a mixed resin solution C2 which contains the first organic resin; the second organic resin in which the alkoxy group has been bound to the main skeleton composed of a polyester structure; and the metallic element.

When film formation is performed on a substrate prepared from polyethylene terephthalate (PET) or the like by using the obtained mixed resin solution A2, B2, or C2, the film-shaped composite resin material 1 is obtained. As for the film formation method, one of film formation method is employed which is selected from a doctor blade method, a die coater method, a knife coater method, and the like. Further, a coating film composed of the composite resin material 1 may be formed by a well-known method such as dipping and spraying by using the mixed resin solution A2, B2, or C2.

Here, these solution preparation processes (mixing and agitation) may entirely be performed in a dry atmosphere. Similarly to the case where a metal alkoxide is mixed, for example, the dry atmosphere may be air or nitrogen having a dew point of −50° C. or lower. In mixing and agitation of the various solutions, for example, a stirrer or a mix rotor may be employed.

For example, employable ones as the first organic resin having a phenylene ether structure include: a polymer or a copolymer of nucleus substituted phenol; and those containing a styrene-based polymer or a rubber denaturated styrene-based polymer when necessary. The first organic resin having such a phenylene ether structure is good in the heat resistance and the insulating property and hence used as various structural components and electric or electronic components.

For example, in the case of polyphenylene ether, employable ones as the first organic resin include a polymer having a repeat unit expressed by general formula (1).

[Chemical formula 1]

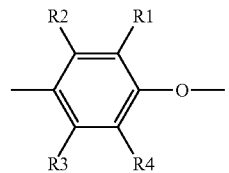

(1)

In general formula (1) given above, R1, R2, R3, and R4 are each independently a hydrogen atom, a halogen atom, a primary or secondary lower alkyl group, a phenyl group, a halo alkyl group, an amino alkyl group, a hydrocarbon oxy group, or a halo hydrocarbon oxy group (here, a halogen atom and an oxygen atom are separated from each other by at least two carbon atoms).

Employable ones as the second organic resin whose main skeleton is composed of polyester include: polycarbonate; polyarylate; and a polymer of these. Polycarbonate and polyarylate are good in the heat resistance, the mechanical properties (such as the impact resistance), and the dielectric characteristics and, in particular, have a high relative permittivity so as to be preferably employable as the dielectric film of a film capacitor. Here, an organic resin other than polycarbonate and polyarylate may be employed as long as the organic resin has a main skeleton composed of polyester.

For example, employable polymers include a polymer having a repeat unit expressed by general formula (2) in the case of polycarbonate or, alternatively, by general formula (3) or (4) in the case of polyarylate.

[Chemical formula 2]

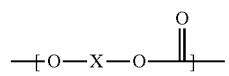

(2)

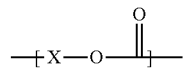

(3)

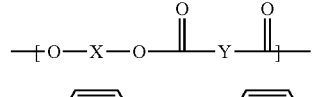

(4)

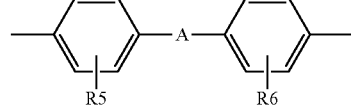

(5)

In general formula (2), (3), or (4), symbol X denotes at least one selected from a divalent group of an aliphatic compound, a divalent group of an annular aliphatic compound, and a divalent group expressed by general formula (5). In general formula (4), symbol Y denotes a substituted or non-substituted allylene group.

In general formula (5), R5 and R6 denote each independently a substituted or non-substituted alkyl group or aryl group or a halogen atom; and symbol A denotes a straight-chain, branched-chain, or annular single-bond alkylene group whose carbon number is 1 to 12.

Specific examples of X in general formula (2), (3), or (4) given above include divalent groups expressed by general formulae (6a) to (6n).

[Chemical formula 3]

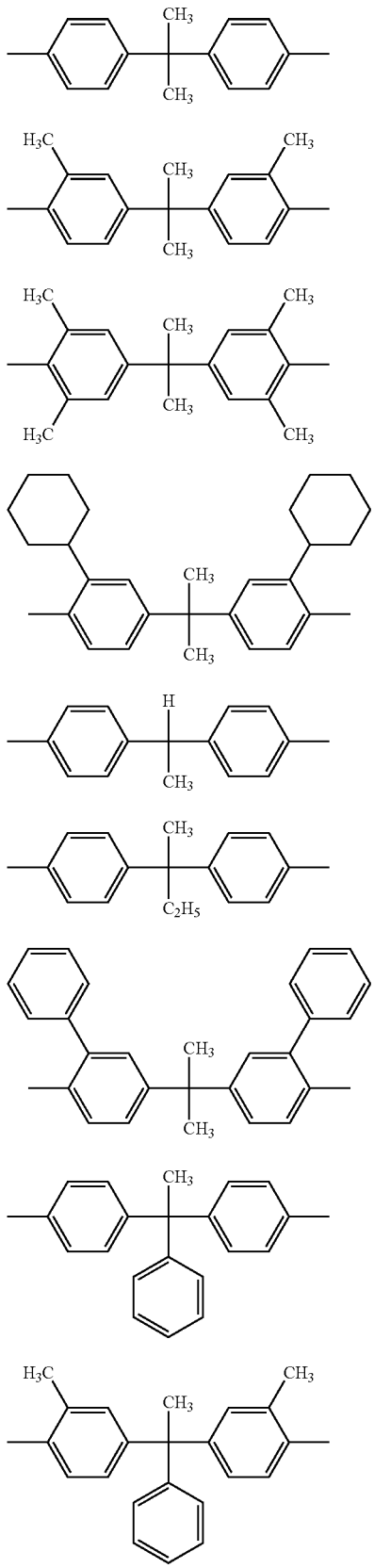

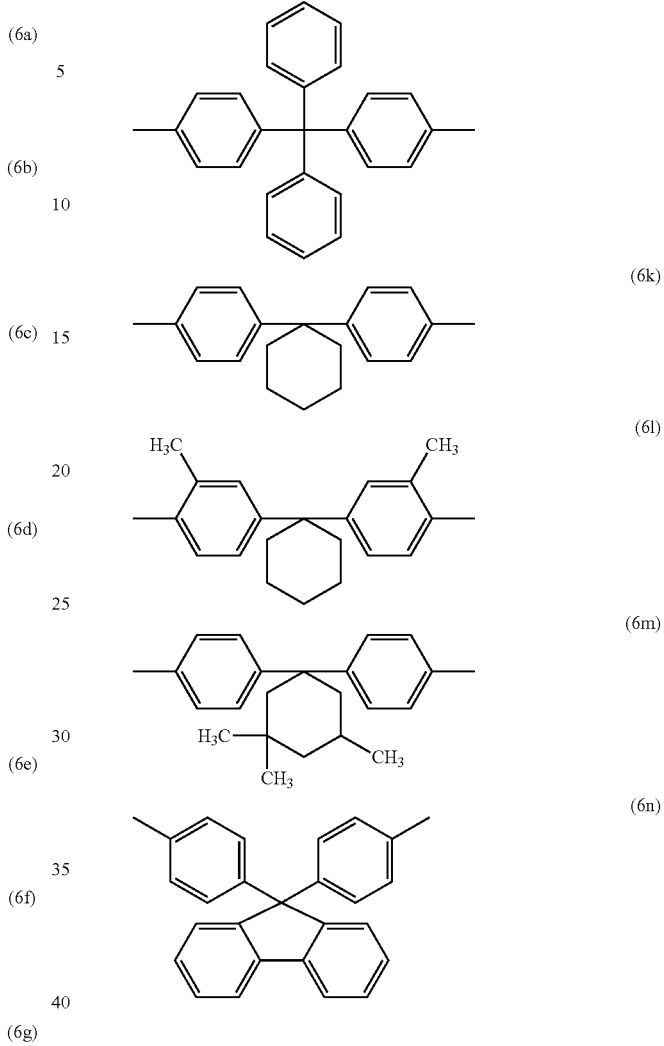

One of these organic resins may be employed alone, or two or more of these organic resins may be employed in combination. Alternatively, a copolymer containing a plurality of components may be employed.

For example, the metal oxide filler may be particles composed of MgO, SiO$_2$, TiO$_2$, ZrO$_2$, Al$_2$O$_3$, or the like. For example, as for the particle diameter of the metal oxide filler, the average of the primary particle diameters may be 100 nm or less and, preferably, 10 to 50 nm.

For example, employable metal alkoxides include a compound expressed by general formula (7).

$$B_pM \qquad (7)$$

Here, symbol B denotes an alkoxy group whose carbon number is 1 to 8 and preferably 1 to 4; symbol M denotes a metallic element such as Mg, Si, Ti, Zr, Fe, Cu, Sn, Al, Ge, Ta, and W; and symbol p denotes an integer of 2 to 6.

Specifically, such compounds include: tetraalkoxysilanes such as tetramethoxysilane, tetraethoxysilane, tetraisopropoxysilane, and tetrabutoxysilane; tetraalkoxytitaniums such as tetra-n-propoxytitanium, tetraisopropoxytitanium (titanium isopropylate, Ti-i-Pr), and tetrabutoxytitanium (titanium(IV) butoxide, Ti-n-but); tetraalkoxyzirconiums such as tetra-n-propoxyzirconium, tetraisopropoxyzirconium, and tetrabutoxyzirconium (zirconium(IV) butoxide, Zr-n-but); and metal alkoxides such as diethoxymagnesium, dimethoxycopper, tributoxyaluminum, tetraethoxygermanium, penta-n-propoxytantalum, and hexaethoxytungsten.

Another examples of metal alkoxides include a compound expressed by general formula (8).

Symbol R7 denotes a hydrogen or, alternatively, an alkyl group or a phenyl group whose carbon number is 1 to 12 and preferably 1 to 5; symbol B denotes an alkoxy group whose carbon number is 1 to 8 and preferably 1 to 4; symbol M denotes a metallic element such as Mg, Si, Ti, Zr, Fe, Cu, Sn, Al, Ge, Ta, and W; symbol R8 denotes an alkylene group or an alkylidene group whose carbon number is 1 to 4 and preferably 2 to 4; symbol Z denotes a general functional group such as an isocyanate group, an epoxy group, a carboxyl group, an acid halide group, an acid anhydride group, an amino group, a thiol group, a vinyl group, a methacrylic group, and a halogen group; symbol q denotes an integer of 0 to 5; symbol r denotes an integer of 1 to 5; symbol s denotes 0 or 1; and symbol t denotes an integer of 0 to 5.

In particular, it is preferable that the metallic element M is one of Mg, Ti, Zr and Al. In a metal alkoxide of these metallic elements, the alkoxy group can easily be added to the main skeleton of the second organic resin.

The following solvents are appropriate for dissolving the first and the second organic resin and the metal alkoxide. Examples of organic solvents include methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethylacetamide, cyclohexane, toluene, chloroform, tetrahydrofuran, and an organic solvent composed of a mixture containing two or more kinds selected from these. It is preferable that the same organic solvent is employed for the organic solvent for dissolving the first organic resin, the organic solvent for dissolving the second organic resin, and the organic solvent for dissolving the metal alkoxide.

For example, the concentration (the resin concentration) of each organic resin (the first organic resin or the second organic resin) in the first resin solution and the second resin solution A1 may be set to 10 to 25 mass %, respectively. For example, the filler concentration in the filler dispersion liquid B1 may be set to 5 to 15 mass %.

For example, the metal alkoxide concentration in the metal alkoxide solution may be set to 5 to 15 mass %. At the time that the second resin solution A1 and the metal alkoxide solution are mixed together, for example, the fraction of the metal alkoxide relative to the second organic resin 100 mass % may be set to 1 to 10 mass %.

For example, mixing together of the first resin solution and the second resin solution A1, mixing together of the filler dispersion liquid B1 and the mixed resin solution A2, mixing together of the metal alkoxide solution and the second resin solution A1, and mixing together (agitation) of the first resin solution and the second resin solution C1 may be performed under the following conditions, for example, at the temperature of 10° C. to 30° C., using a stirrer, a mix rotor or the like and at a revolution rate of 100 to 500 rpm. The agitation time may be 24 to 96 hours. It is preferable that these processes, that is, the preparation of each solution and the mixing and stirring processes, are entirely performed in a dry atmosphere (e.g., in air, nitrogen, or the like having a dew point of −50° C. or lower).

The composite resin material 1 may contain an organic solvent. In particular, when the composite resin material 1 contains a hydrophobic organic solvent, the percentage of water absorption in the composite resin material 1 can be reduced. Toluene and chloroform are organic solvents whose solubility to water is remarkably low. Thus, when such an organic solvent is contained, the percentage of water absorption in the composite resin material 1 can be reduced further. Further, when the composite resin material 1 contains an organic solvent, such an advantage also is obtained that the adhesion property between the film-shaped composite resin material 1 formed on a substrate and the substrate decreases so that the composite resin material 1 can easily be detached from the substrate, that is, the detachability of the composite resin material 1 from the substrate is improved. Here, it is preferable that the organic solvent contained in the composite resin material 1 of the present embodiment dissolves both the first organic resin and the second organic resin. In particular, a good solvent to both the first organic resin and the second organic resin is preferable. Here, the good solvent indicates a solvent having a high solubility to a solute. In contrast, a solvent having a low solubility to a solute is referred to as a poor solvent. For example, good solvents to both the first organic resin and the second organic resin include chloroform and toluene. Chloroform and toluene have a high hydrophobicity and hence provides also an effect of reducing the percentage of water absorption in the composite resin material 1.

It preferable that the content of the organic solvent in the composite resin material 1 is 5 mass % or lower. When the content of the organic solvent contained in the composite resin material 1 is set to 5 mass % or lower, in the obtained composite resin material 1, the film becomes uniformly dense and the variation in various characteristics becomes small. Here, the expression that the film is uniformly dense and the variation in various characteristics is small indicates that, for example, in the case of the film-shaped composite resin material 1, the number of defects (such as portions of locally small wall-thickness, voids, different phases, aggregations, and low density portions) serving as breakage starting points is small.

FIG. 3A is a sectional view schematically showing a structure that a metal film 4 is disposed on the surface of the film-shaped resin material 1 (referred to as a dielectric film 1, in some cases hereinafter). FIG. 3B is an external appearance perspective view showing a film capacitor according to a first embodiment.

The film capacitor A of the first embodiment shown in FIG. 3B has a basic configuration that external electrodes 7 are attached to a body member 6 composed of a stacked body of metallized films 5 in which a metal film 4 is disposed on one side of the dielectric film 1. Then, lead wires 8 are provided when necessary.

In this case, from the perspectives of the insulating property and the environmental resistance, the body member 6, the external electrodes 7, and a part of the lead wires 8 may be covered by an exterior member 9 when necessary. FIG. 3B shows a state where a part of the exterior member 9 is removed and then a portion where the exterior member 9 is removed is indicated by a dashed line.

In addition to the stacked type shown in FIGS. 3A and 3B, the composite resin material 1 (the dielectric film 1) may be applied to a film capacitor B of wound type.

Figure 4:
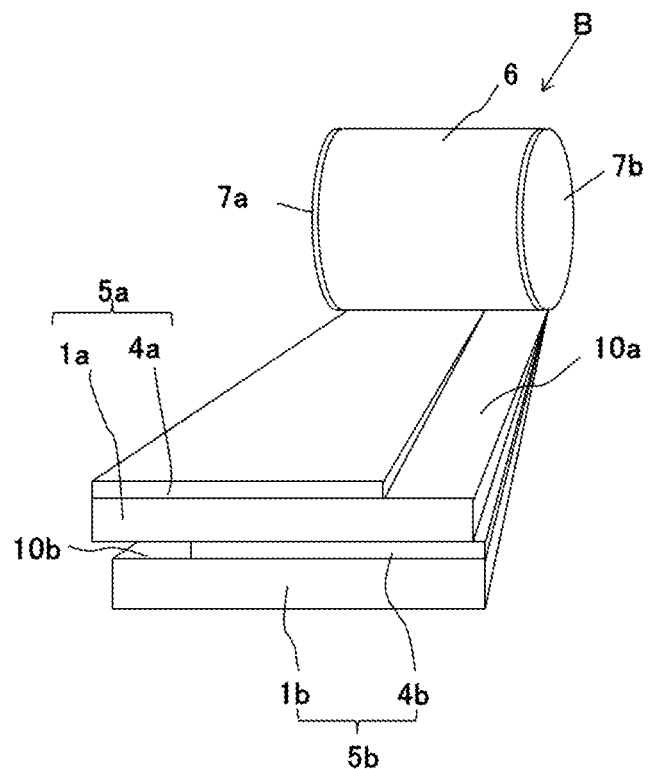
FIG. 4 is a development perspective view schematically showing a configuration of a film capacitor according to a second embodiment.

FIG. 4 is a development perspective view schematically showing a configuration of a second embodiment according to a film capacitor.

In the film capacitor B, a body member 6 is constituted by wound metallized films 5a and 5b. Then, end faces of the body member 6 opposite to each other are respectively provided with metallikon electrodes serving as external electrodes 7a and 7b.

The metallized films 5a and 5b have a configuration that a metal film 4a or 4b is disposed on a surface of a dielectric film 1a or 1b. In this case, the metal film 4a or 4b is formed so that a portion where the metal film 4a or 4b is not formed (referred to as a metal film-free portion 10a or 10b, in some cases hereinafter) remains continuously along a longitudinal direction thereof on one end side of the dielectric film 1a or 1b in a width direction thereof. The metal film-free portion 10a or 10b is a portion where the dielectric film 1a or 1b is exposed.

The metallized films 5a and 5b are arranged so that the metal film-free portions 10a and 10b may be located on the opposite sides to each other in the width direction of the dielectric films 1a and 1b and so that the metal films 4a or 4b may be overlaid on and deviated from each other so as to become wider in the width direction.

That is, in the film capacitor B, the metallized film 5a comprising the dielectric film 1a and the metal film 4a and the metallized film 5b comprising the dielectric film 1b and the metal film 4b are overlaid on and wound around each other as shown in FIG. 4. Here, in FIG. 4, for ease in understanding of the configuration of the film capacitor B, the thicknesses of the dielectric films 1a and 1b and the metal films 4a and 4b are illustrated as if increasing from the far side toward the near side in FIG. 4. However, actually, these thicknesses are fixed.

Figure 5:
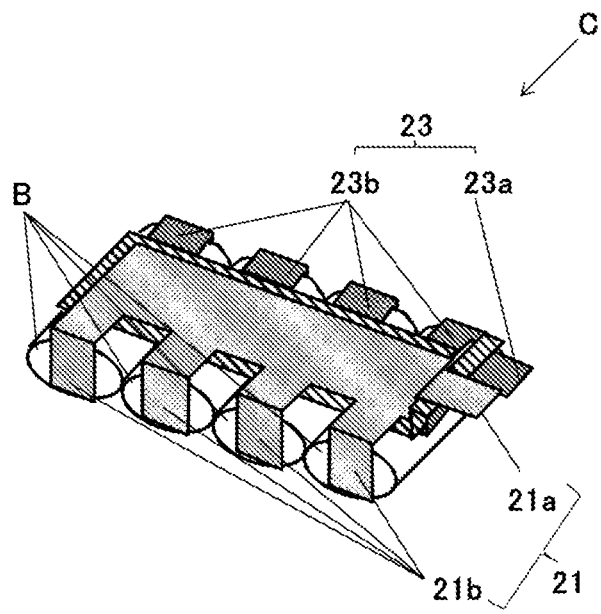
FIG. 5 is a perspective view schematically showing a configuration of one embodiment of a combination type capacitor.

FIG. 5 is a perspective view schematically showing a configuration of one embodiment of a combination type capacitor. In FIG. 5, for ease in understanding of the configuration, the illustration of a case and a resin for molding is omitted. A combination type capacitor C has a configuration that a plurality of the film capacitors B are connected in parallel with each other by a pair of bus bars 21 and 23. The bus bars 21 and 23 are composed of external connection terminal portions 21a and 23a and extraction terminal portions 21b and 23b connected to the external electrodes 7a and 7b of the film capacitor B, respectively.

When the film-shaped composite resin material 1 (the dielectric film 1) is employed as the dielectric film for constituting the film capacitor B or the combination type capacitor C, the thickness can be reduced in comparison with dielectric films of the conventional art which have been composed of polypropylene, polyethylene terephthalate, or the like. This permits size reduction and capacity enhancement in the film capacitor B and the combination type capacitor C.

Further, the first organic resin having a phenylene ether structure which is the main component of the dielectric film 1 and the second organic resin whose main skeleton is composed of a polyester bond are both organic resins good in the heat resistance. Thus, the heat resistance in the film capacitor B and the combination type capacitor C is improved so that capacitor products can be obtained in which the decrease in the electrostatic capacitance and the insulation resistance is small even in usage in a high temperature range (e.g., in an atmosphere at a temperature of 80° C. or higher). Here, in addition to the planar arrangement as shown in FIG. 5, the combination type capacitor C may have a configuration that the film capacitors B are stacked together so that the flat faces thereof overlap with each other. Also in this configuration, a similar effect can be obtained.

Figure 6:
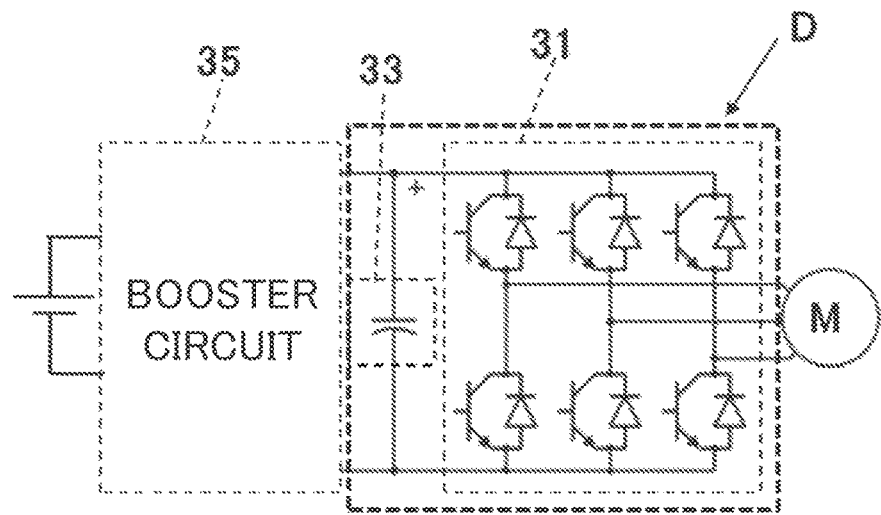
FIG. 6 is a schematic configuration diagram for describing a configuration of one embodiment of an inverter.

FIG. 6 is a schematic configuration diagram for describing a configuration of one embodiment of an inverter. FIG. 6 shows an example of an inverter D for generating alternating current from direct current resulting from rectification. As shown in FIG. 6, the inverter D of the present embodiment has a configuration provided with a bridge circuit 31 including switching elements (e.g., IGBTs (Insulated Gate Bipolar Transistors) and with a capacitance member 33 arranged between input terminals of the bridge circuit 31 for the purpose of voltage stabilization. Here, the film capacitor B or the combination type capacitor C described above is employed as the capacitance member 33.

Here, the inverter D is connected to a booster circuit 35 for boosting a voltage of a direct-current power supply. On the other hand, the bridge circuit 31 is connected to a motor generator (an electric motor M) serving a driving source.

When the film capacitor B or the combination type capacitor C described above is applied to the capacitance member 33 of the inverter D, the volume of the capacitance member 33 occupied in the inverter D can be reduced. This provides the inverter D including the capacitance member 33 having a reduced size and a larger electrostatic capacitance. Further, it is possible to obtain the inverter D in which the variation in the modulated wave is small even in a high temperature range.

Figure 7:
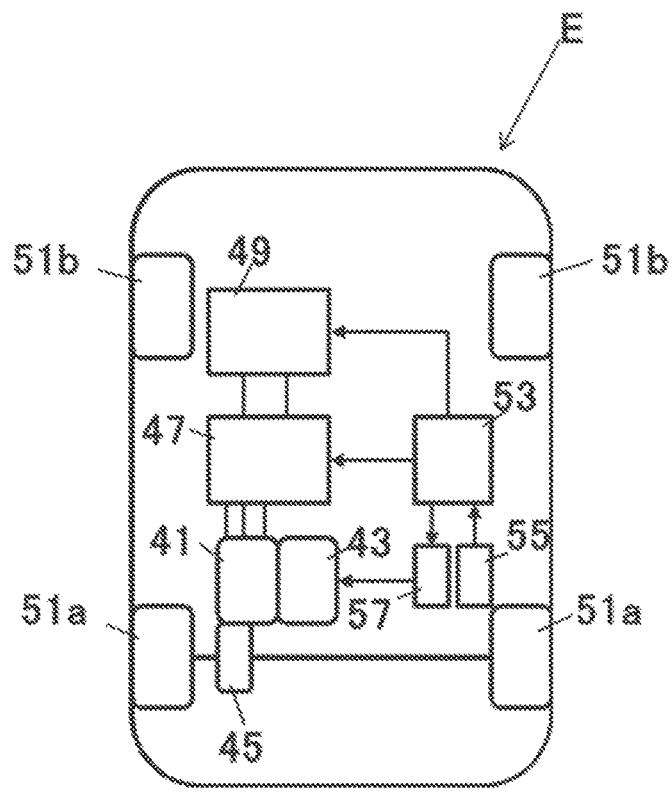
FIG. 7 is a schematic configuration diagram showing one embodiment of an electric vehicle.

FIG. 7 is a schematic configuration diagram showing one embodiment of an electric vehicle. FIG. 7 shows an example of a hybrid electric vehicle (HEV) serving as an electric vehicle E.

In FIG. 7, reference numeral 41 denotes an driving motor, reference numeral 43 denotes an engine, reference numeral 45 denotes a transmission, reference numeral 47 denotes an inverter, reference numeral 49 denotes a power supply (battery), reference numerals 51a and 51b denote a front wheel and a rear wheel, respectively.

The electric vehicle E has such a mainly function that the output of either or both of the electric motor 41 and the combustion engine 43 serving as driving sources is transmitted to a pair of the right and left front wheels 51a through the transmission 45. Then, the power supply 49 is connected to the motor 41 through the inverter 47.

Further, the electric vehicle E shown in FIG. 7 is provided with a vehicle ECU 53 for performing comprehensive control of the entire electric vehicle E. The vehicle ECU 53 receives driving signals inputted from the electric vehicle E in response to the operation of an ignition key 55, an accelerator pedal, a brake or the like (not shown) performed by a driver or the like. On the basis of the driving signals, the vehicle ECU 53 outputs instruction signals to an engine ECU 57, the power supply 49, and the inverter 47 serving as a load. In response to the instruction signals the engine ECU 57 controls the revolution rate of the combustion engine 43 to drive the electric vehicle E.

In a case where the inverter D employing as the capacitance member 33 the film capacitor B or the combination type capacitor C of the present embodiment is mounted, for example, on the electric vehicle E as shown in FIG. 7, the weight of the vehicle can be reduced in comparison with an inverter employing a film capacitor or a combination type capacitor adopting a conventional dielectric film composed of polypropylene, polyethylene terephthalate or the like. This improves the fuel consumption. Further, the fraction occupied by the automobile control device within the engine room can be reduced. Further, a function of improving the impact resistance can be provided in the interior of the engine room, so that the safety of the vehicle can be improved further.

Here, in addition to the dielectric film and the film capacitor described above, the composite resin material 1 is applicable also to the insulator film, the insulating layer, the insulation coating, and the like of an electronic component of diverse kind. For example, the composite resin material 1 may preferably be employed as an insulating layer of a wiring board and a covering of an electric wire. Further, in addition to the above-mentioned hybrid electric vehicle (HEV), the inverter D of the present embodiment is applicable to various power conversion application products such as an electric vehicle (EV), an electric bicycle, an electric generator, and a solar battery.

EXAMPLES

Example 1

PPE Powder (manufactured by Asahi Kasei Chemicals Corporation; referred to as PPE, hereinafter) of Xyron (registered trademark) composed of polyphenylene ether was employed as the first organic resin having a phenylene ether structure. Further, polyarylate (U-100; manufactured by UNITIKA LTD.) was employed as the second organic resin having a main skeleton composed of polyester.

PPE was dissolved into chloroform to obtain the first resin solution having a resin concentration of 20 mass %. Further, U-100 was dissolved into chloroform to obtain the second resin solution A1 having a resin concentration of 20 mass %.

The first resin solution and the second resin solution A1 were mixed together and then agitated by using a mix rotor at 50 rpm for 24 hours to obtain the mixed resin solution A2. Here, the entire solution preparation processes were performed in a dry nitrogen atmosphere. The mixing ratio between the first organic resin (PAR) and the second organic resin (PPE) is listed in Table 1 in terms of the mass fraction relative to the total amount of the first organic resin and the second organic resin.

The obtained mixed resin solution A2 was applied onto a substrate of silicon wafer by using a coater and then dried at 180° C. for 1 hour to prepare a film-shaped composite resin material (a dielectric film).

On the prepared dielectric film, $^1$H-NMR (proton NMR) measurement and gas chromatograph (GC) measurement were performed to identify the organic resin and the organic solvent constituting the dielectric film and check the contents thereof. On the basis of the integral value I1 of the peak of –H (6.4 to 6.9 ppm) originating from the benzene site of the first organic resin (PPE) and the integral value I2 of the peak of –H (9.0 ppm, 9.1 to 8.87 ppm) originating from the isophthalic acid site of the second organic resin (U-100), their contents (I1/(I1+I2) and I2/(I1+I2)) were calculated. As a result, the content percentages were similar to those listed in Table 1. The content of the organic solvent (chloroform) in the dielectric film is listed in Table 1.

The cross section of the dielectric film was observed by using a scanning transmission electron microscope (STEM; manufactured by Hitachi High-Technologies Corporation) at 10000-fold magnification (bright-field image; acceleration voltage of 30 kV), so that the average thickness and the cross sectional structure of the dielectric film were checked. As for the average thickness of the dielectric film, the measurement was performed as ten places and then the average thereof was calculated. As a result, the average thickness thereof was 4 μm in each sample. The average particle diameter of the organic resin particles was calculated by performing image analysis on the cross section photograph of the dielectric film and then converting the cross sectional area of the organic resin particle into a circle equivalent diameter. The presence or absence (kind) of organic resin particles and the average particle diameter and the Dp/Dt ratio of the organic resin particles are listed in Table 1.

Further, the surface roughness of the dielectric film was measured by using an atomic force microscope (AFM). The obtained results are listed in Table 1 in such a manner that a sample having an average surface roughness Sa of 50 nm or less, a maximum height Sz of 500 nm or less, and a ten-point average roughness SzJIS of 350 nm or less is rated as "Good" and that a sample having a measured value exceeding each above-mentioned value is rated as "Poor".

As for the heat resistance, the glass transition temperature Tg of the dielectric film was evaluated by thermogravimetry-differential thermal analysis (TG-DTA). The obtained glass transition temperature Tg of the dielectric film is listed in Table 1.

The relative permittivity (εr), the breakdown electric field (BDE), and the lifetime of the dielectric film were measured as follows. The dielectric film was peeled off from the silicon wafer substrate and then a metal film (75 nm in thickness) of Al was formed on both faces of the dielectric film by vacuum vapor deposition to prepare a metallized film. The relative permittivity (εr) of the dielectric film was calculated according to a formula $C=\varepsilon r \times S/d$ on the basis of the electrostatic capacitance of the sample measured by using an LCR meter. In the formula, symbol C denotes the electrostatic capacitance of the sample; symbol S denotes the area of the dielectric film located between the metal films; and symbol d denotes the distance between the metal films (the average thickness of the dielectric film).

The breakdown electric field (BDE) was obtained as follows. That is, a direct-current voltage was applied between the metal films of the metallized film with a boost rate of 10 V per second and then the BDE value was obtained from a voltage value at the moment that a leakage current exceeds 1.0 mA. The relative permittivity (εr) and the breakdown electric field (BDE) of the dielectric film are listed in Table 1.

Further, a direct-current voltage of 500 V/μm was applied between the metal films of the metallized film at a temperature of 110° C. and then the time having elapsed until the leakage current value exceeds 1.0 mA was measured so that degradation in the insulating property of the dielectric film was evaluated. This time was adopted as the lifetime of the dielectric film and is listed in Table 1. The measurement region for the metallized film was of a size of 1.5 mm×1.5 mm.

TABLE 1

| | Ratio of organic resins *1 | | | Organic resin particles | | | | Heat | Electrical characteristics | | |
|---|---|---|---|---|---|---|---|---|---|---|---|
| | First (PPE) | Second (U-100) | Organic | | Avarage | | | resistance | Relative | | |
| Sample No. | Part by mass | Part by mass | solvent content *2 mass % | Kind | particle diameter nm | Dp/Dt *3 | Surface roughness | Tg *4 ° C. | permittivity | BDE V/μm | Lifetime *5 Hr |
| 1 | 100 | 0 | 5 | — | — | — | Poor | 210 | 2.60 | 669 | 0.26 |
| 2 | 90 | 10 | 5 | PAR | 140 | 1.4 | Fair | 210 | 2.66 | 623 | 0.24 |
| 3 | 75 | 25 | 5 | PAR | 320 | 1.6 | Good | 210 | 2.75 | 693 | 0.19 |
| 4 | 70 | 30 | 5 | PAR | 330 | 1.5 | Good | 210 | 2.78 | 678 | 0.17 |
| 5 | 50 | 50 | 5 | PAR | 350 | 1.5 | Good | 210 | 2.89 | 577 | 0.12 |
| 6 | 25 | 75 | 5 | PPE | 300 | 2 | Good | 210 | 3.10 | 543 | 0.01 |
| 7 | 0 | 100 | 5 | — | — | — | Good | 210 | 3.20 | 474 | 0.01 |

*1 Fraction of each organic resin relative to total amount of 100 parts by mass of PPE and PAR is shown, where PPE (polyphenylene ether) served as first organic resin and PAR (polyarylate) served as second organic resin.
*2 Content of chloroform contained in composite resin material.
*3 Ratio of length (Dp) in film planar direction relative to length (Dt) in thickness direction.
*4 Tg: Glass transition temperature of composite resin material.
*5 Time having elapsed until leakage current value exceeds 1.0 mA under conditions of DC voltage of 500 V/μm and temperature of 110° C.

In Sample Nos. 2 to 6, it has been confirmed that a continuous phase of one of the first organic resin and the second organic resin contained organic resin particles of the other one. Here, the shape of the organic resin particles in the cross section of the dielectric film was circular or elliptic. In these dielectric films, the glass transition temperature Tg was high and hence the heat resistance was good, the relative permittivity εr was high, and the insulating property was high even with a thickness T of 5 μm or less, so that good balance was achieved. On the other hand, in Sample Nos. 1 and 7, the presence of organic resin particles was not found and variations were seen in the various characteristics.

Example 2

As the metal oxide filler, titanium oxide ($TiO_2$), aluminum oxide ($Al_2O_3$), silicon oxide ($SiO_2$), magnesium oxide (MgO), or zirconium oxide ($ZrO_2$) was employed. As for the particle diameter of each filler, a material having a primary particle diameter of 30 to 45 nm was employed.

As the metal alkoxide, zirconium(IV) butoxide (Zr-n-but), titanium(IV) butoxide (Ti-n-but), titanium(IV) isopropoxide (Ti-i-Pr), or aluminum alkyl acetoacetate diisopropylate (Al-M) was employed.

Each metal oxide filler was dispersed into chloroform to prepare the filler dispersion liquid B1 having a filler concentration of 5 mass %. The filler dispersion liquid B1 and the mixed resin solution A2 were mixed together so that the metal oxide may be in an amount of one part by mass relative to the total amount of 100 parts by mass of the first and the second resin. Then, agitation was performed by using a stirrer at 300 rpm for 24 hours to obtain the mixed resin solution B2. The ratio of the organic resins in the mixed resin solution A2 was as listed in Table 2.

Zr-n-but, Ti-n-but, Ti-i-Pr, or Al-M was dissolved into chloroform to obtain each metal alkoxide solution having a metal alkoxide concentration of 10 mass %.

The metal alkoxide solution was added to the second prepared resin solution A1 to obtain a mixture solution. At that time, adjustment was performed so that the metal alkoxide have the fraction listed in Table 2 relative to 100 parts by mass of U-100. The mixture solution was agitated by using a stirrer at 300 rpm for 24 hours to obtain the second resin solution C1.

The first resin solution and the second resin solution C1 were mixed together so that the ratio between PPE and U-100 may be equal to the value listed in Table 2. Then, agitation was performed by using a stirrer at 300 rpm for 24 hours to obtain the mixed resin solution C2. Here, the entire solution preparation processes were performed in dry air having a dew point of −50° C. or lower.

The mixed resin solution B2 or C2 was applied onto a polyethylene terephthalate (PET) substrate by using a coater. Then, drying was performed at 180° C. for 1 hour to dry out the solvent and thereby prepare a film-shaped composite resin material (a dielectric film). The thickness of the dielectric film was 3.5 μm.

TABLE 2

| | Ratio of organic resins *1 | | Metallic | Metal Alkoxide | | |
|---|---|---|---|---|---|---|
| Sample No. | First (PPE) Part by mass | Second (U-100) Part by mass | element source Kind | Alkoxy group | Added amount *6 Part by mass |
| 8 | 99 | 1 | Zr-n-but | [$O(CH_2)_3CH_3$] | 20 |
| 9 | 99 | 1 | Ti-i-Pr | [$OCH(CH_3)_2$] | 20 |
| 10 | 99 | 1 | Al-M | [$OCH(CH_3)_2$] | 20 |
| 11 | 95 | 5 | Zr-n-but | [$O(CH_2)_3CH_3$] | 2 |
| 12 | 95 | 5 | Zr-n-but | [$O(CH_2)_3CH_3$] | 10 |
| 13 | 95 | 5 | Zr-n-but | [$O(CH_2)_3CH_3$] | 20 |
| 14 | 95 | 5 | Ti-i-Pr | [$OCH(CH_3)_2$] | 20 |
| 15 | 95 | 5 | Al-M | [$OCH(CH_3)_2$] | 20 |
| 16 | 90 | 10 | Zr-n-but | [$O(CH_2)_3CH_3$] | 10 |
| 17 | 90 | 10 | Ti-n-but | [$O(CH_2)_3CH_3$] | 10 |
| 18 | 90 | 10 | Ti-i-Pr | [$OCH(CH_3)_2$] | 10 |
| 19 | 90 | 10 | Al-M | [$OCH(CH_3)_2$] | 10 |
| 20 | 90 | 10 | $TiO_2$ | — | — |
| 21 | 90 | 10 | $Al_2O_3$ | — | — |
| 22 | 90 | 10 | $SiO_2$ | — | — |
| 23 | 90 | 10 | MgO | — | — |
| 24 | 90 | 10 | $ZrO_2$ | — | — |
| 25 | 75 | 25 | Zr-n-but | [$O(CH_2)_3CH_3$] | 4 |
| 26 | 75 | 25 | Zr-n-but | [$O(CH_2)_3CH_3$] | 10 |
| 27 | 75 | 25 | Ti-i-Pr | [$OCH(CH_3)_2$] | 10 |
| 28 | 75 | 25 | Al-M | [$OCH(CH_3)_2$] | 10 |
| 29 | 70 | 30 | Zr-n-but | [$O(CH_2)_3CH_3$] | 10 |
| 30 | 50 | 50 | Zr-n-but | [$O(CH_2)_3CH_3$] | 5 |
| 31 | 50 | 50 | Zr-n-but | [$O(CH_2)_3CH_3$] | 8 |

TABLE 2-continued

| | Ratio of organic resins *1 | | Metallic | Metal Alkoxide | |
|---|---|---|---|---|---|
| Sample No. | First (PPE) Part by mass | Second (U-100) Part by mass | element source Kind | Alkoxy group | Added amount *6 Part by mass |
| 32 | 50 | 50 | Ti—i-Pr | [OCH(CH$_3$)$_2$] | 10 |
| 33 | 50 | 50 | Al—M | [OCH(CH$_3$)$_2$] | 10 |

*1 Fraction of each organic resin relative to total amount of 100 parts by mass of PPE and PAR is shown, where PPE (polyphenylene ether) served as first organic resin and PAR (polyarylate) served as second organic resin.
*6 Fraction relative to 100 parts by mass of U-100.

Similarly to Implementation example 1, $^1$H-NMR (proton NMR) measurement was performed on the prepared dielectric film. On the basis of the integral value I1 of the peak of –H (6.4 to 6.9 ppm) originating from the benzene site of the first organic resin (PPE) and the integral value I2 of the peak of –H (9.0 ppm, 9.1 to 8.87 ppm) originating from the isophthalic acid site of the second organic resin (U-100), their contents (I1/(I1+I2) and I2/(I1+I2)) were calculated. As a result, the content percentages were similar to those listed in Table 2.

In the $^1$H-NMR spectrum of the sample obtained by mixing together the first resin solution and the second resin solution C1, that is, the sample in which the metal alkoxide has been added, a peak near 4.4 ppm (4.43 to 4.23 ppm) was observed in addition to the peaks originating from U-100 and PPE. This peak was not observed in Sample Nos. 1 to 7 and 20 to 24. Further, as a result of HMQC (Heteronuclear Multiple Quantum Coherence) measurement and HMBC (Heteronuclear Multiple Bond Connectivity) measurement in two-dimensional correlation NMR spectroscopy, it has been recognized that this peak originates from the hydrogen bound to the carbon atom located adjacent to the oxygen atom in the alkoxy group (—OCH$_2$CH$_2$CH$_2$CH$_3$ or —OCH(CH$_3$)$_2$). That is, it has been recognized that the alkoxy group is directly bound to the main skeleton of the organic resin by an ester bond without intervention of the metallic element. Any peak originating from an unreacted metal alkoxide was not found. Further, on the basis of the obtained $^1$H-NMR spectrum, the fraction (the amount of denaturation) of the alkoxy group relative to the entire ester bonds contained in the dielectric film was calculated. The obtained results are listed in Table 3.

The kind and the content of the metallic element contained in the dielectric film was checked by ICP emission spectral analysis. The metallic element contained in the dielectric film was the same as the metallic element constituting the metal alkoxide having been added when the solution for the dielectric film has been prepared.

The cross section of the dielectric film was observed by using a scanning transmission electron microscope (STEM, manufactured by Hitachi High-Technologies Corporation) at 10000-fold magnification (bright-field image; acceleration voltage of 30 kV), so that the cross sectional structure was checked. It has been confirmed that in Sample Nos. 8 to 33, the particles (the organic resin particles) of the second organic resin (U-100) were dispersed in the first organic resin (PPE).

The average particle diameter of the organic resin particles was calculated by performing image analysis on the cross section photograph of the dielectric film and then converting the cross sectional area of the organic resin particle into a circle equivalent diameter. The average particle diameter of the organic resin particles is listed in Table 3.

The relative permittivity and the lifetime characteristics of the dielectric film were evaluated as follows. The PET film was peeled off from the dielectric film and then an electrode layer of Al having an average thickness of 75 nm was formed on both faces of the dielectric film by vacuum vapor deposition to prepare a metallized film.

The relative permittivity (εr) of the dielectric film was calculated according to a formula C=εr×S/d on the basis of the electrostatic capacitance of the sample measured by using an LCR meter.

The breakdown electric field (BDE) was obtained as follows. That is, a direct-current voltage was applied between the metal films of the metallized film with a boost rate of 10 V per second and then the BDE value was obtained from a voltage value at the moment that a leakage current exceeds 1.0 mA. The relative permittivity (εr) and the breakdown electric field (BDE) of the dielectric film are listed in Table 3.

A direct-current voltage of 500 V/μm was applied between the metal films of the obtained metallized film at a temperature of 110° C. and then the time having elapsed until the leakage current value exceeds 1.0 mA was measured. This time was adopted as the lifetime of the dielectric film and is listed in Table 3. The measurement region for the metallized film was of a size of 1.5 mm×1.5 mm.

TABLE 3

| | Organic resin particles | | Metallic element | | Alkoxy | Electrical characteristics | | |
|---|---|---|---|---|---|---|---|---|
| Sample No. | Kind — | Average particle diameter *7 nm | Kind — | Content Part by mass | group content *8 % | Relative permittivity — | BDE V/μm | Lifetime *5 Hr |
| 8 | PAR | 20 | Zr | 0.05 | 24 | 2.60 | 819 | 0.39 |
| 9 | PAR | 40 | Ti | 0.02 | 17 | 2.60 | 726 | 0.52 |
| 10 | PAR | 30 | Al | 0.02 | 15 | 2.60 | 797 | 0.59 |
| 11 | PAR | 50 | Zr | 0.02 | 2.2 | 2.62 | 645 | 0.33 |
| 12 | PAR | 40 | Zr | 0.12 | 14 | 2.62 | 716 | 1.96 |
| 13 | PAR | 30 | Zr | 0.24 | 24 | 2.61 | 801 | 1.56 |
| 14 | PAR | 50 | Ti | 0.08 | 13 | 2 62 | 716 | 1.04 |
| 15 | PAR | 60 | Al | 0.03 | 4 | 2.62 | 779 | 0.76 |
| 16 | PAR | 70 | Zr | 0.24 | 14 | 2.66 | 777 | 2.10 |
| 17 | PAR | 90 | Ti | 0.14 | 13 | 2.65 | 701 | 1.12 |
| 18 | PAR | 90 | Ti | 0.17 | 14 | 2.66 | 701 | 0.97 |
| 19 | PAR | 90 | Al | 0.05 | 4 | 2 66 | 767 | 0.83 |
| 20 | PAR | 130 | Ti | 0.6 | — | 2.66 | 719 | 0.52 |

TABLE 3-continued

| | Organic resin particles | | Metallic element | | Alkoxy | Electrical characteristics | | |
|---|---|---|---|---|---|---|---|---|
| Sample No. | Kind — | Average particle diameter *7 nm | Kind — | Content Part by mass | group content *8 % | Relative permittivity — | BDE V/μm | Lifetime *5 Hr |
| 21 | PAR | 140 | Al | 0.53 | — | 2.66 | 742 | 0.41 |
| 22 | PAR | 130 | Si | 0.47 | — | 2.66 | 725 | 0.37 |
| 23 | PAR | 130 | Mg | 0.6  | — | 2.66 | 745 | 0.45 |
| 24 | PAR | 120 | Zr | 0.74 | — | 2.66 | 761 | 0.72 |
| 25 | PAR | 240 | Zr | 0.24 | 5    | 2.75 | 741 | 0.38 |
| 26 | PAR | 180 | Zr | 0.59 | 14   | 2.73 | 789 | 0.70 |
| 27 | PAR | 210 | Ti | 0 42 | 14   | 2.75 | 677 | 0.52 |
| 28 | PAR | 200 | Al | 0.14 | 4    | 2.75 | 749 | 0.41 |
| 29 | PAR | 200 | Zr | 0.71 | 14   | 2.77 | 698 | 0.58 |
| 30 | PAR | 270 | Zr | 0.59 | 6.9  | 2.88 | 676 | 0.37 |
| 31 | PAR | 230 | Zr | 0.95 | 11   | 2.87 | 698 | 0.31 |
| 32 | PAR | 300 | Ti | 0.84 | 14   | 2 88 | 593 | 0.26 |
| 33 | PAR | 290 | Al | 0.27 | 4    | 2 88 | 679 | 0.31 |

*5 Time having elapsed until the leakage current value exceeds 1.0 mA under conditions of DC voltage of 500 V/μm and temperature of 110° C.
*7 Average particle diameter of organic resin particles (U-100).
*8 Molar ratio of alkoxy group relative to entire ester bonds contained in dielectric film.

In Sample Nos. 20 to 24, the metal oxide filler of particles was contained. Thus, degradation in the insulating property was suppressed so that the lifetime characteristics were improved. Further, in Sample Nos. 8 to 19 and 25 to 33, the second organic resin (denaturated U-100) which has a main skeleton composed of a polyester structure and which contains an alkoxy group was dispersed as organic resin particles. Thus, degradation in the insulating property was suppressed further, so that the lifetime characteristics were improved in comparison with the case of not containing an alkoxy group.

REFERENCE SIGNS LIST

A, B: Film capacitor
C: Combination type capacitor
D, 47: Inverter
E: Electric vehicle
1, 1a, 1b: Composite resin material (Dielectric film)
2: Continuous phase
3: Organic resin particle
4, 4a, 4b: Metal film
5, 5a, 5b: Metallized film
6: Body member
7, 7a, 7b: External electrode
8: Lead wire
9: Exterior member
10a, 10b: Metal film-free portion
21, 23: Bus bar
31: Bridge circuit
33: Capacitance member
35: Booster circuit
41: Electric motor
43: Engine
45: Transmission
47: Inverter
49: Power supply
51a: Front wheel
51b: Rear wheel
53: Vehicle ECU
55: Ignition key
57: Engine ECU

The invention claimed is:

1. A composite resin material, comprising:
a first organic resin having a phenylene ether structure; and
a second organic resin having a main skeleton composed of a polyester structure and containing an alkoxy group,
one of the first organic resin and the second organic resin forming a continuous phase,
the other one thereof being present within the continuous phase, as organic resin particles having an average particle diameter of 1 μm or less.

2. The composite resin material according to claim 1, further comprising a metallic element.

3. The composite resin material according to claim 1, wherein the organic resin particles are composed of the second organic resin and have an average particle diameter of 300 nm or less.

4. The composite resin material according to claim 1, wherein a fraction of the second organic resin relative to a total amount of 100 parts by mass of the first organic resin and the second organic resin is 1 to 75 parts by mass.

5. The composite resin material according to claim 1, wherein the main skeleton of the second organic resin is bound to the alkoxy group by an ester bond.

6. The composite resin material according to claim 1, wherein a molar ratio of the alkoxy group to all ester bonds present in the first organic resin and the second organic resin is 3% to 30%.

7. The composite resin material according to claim 1, wherein a fraction of the second organic resin relative to a total amount of 100 parts by mass of the first organic resin and the second organic resin is 1 to 30 parts by mass.

8. The composite resin material according to claim 1, further comprising an organic solvent,
wherein the organic solvent dissolves both the first organic resin and the second organic resin.

9. A dielectric film, comprising:
the composite resin material according to claim 1.

10. The composite resin material according to claim 2, wherein a content of the metallic element is 0.01 to 1.0 mass % relative to a total amount of the composite resin material.

11. The composite resin material according to claim 2, wherein the metallic element includes at least one selected from Mg, Ti, Zr, and Al.

12. The composite resin material according to claim 8, wherein a content of the organic solvent is 5 mass % or lower.

13. The composite resin material according to claim 8, wherein the organic solvent is composed of at least one of chloroform and toluene.

14. A film capacitor, comprising:

a body member comprising a wound body or stacked body of a metallized film in which a metal film is disposed on the dielectric film according to claim 9; and an external electrode disposed on the body member.

15. A combination type capacitor, comprising:

a plurality of the film capacitors according to claim 14; and at least one bus bar connecting all of the plurality of the film capacitors.

16. An inverter, comprising:

a bridge circuit including switching elements; and a capacitance member connected to the bridge circuit, the capacitance member including the film capacitor according to claim 14.

17. An inverter, comprising:

a bridge circuit including switching elements; and a capacitance member connected to the bridge circuit, the capacitance member including the combination type capacitor according to claim 15.

18. An electric vehicle, comprising:

a power supply;

an inverter connected to the power supply;

an electric motor connected to the inverter; and wheels driven by the electric motor, the inverter being the inverter according to claim 16.

19. An electric vehicle, comprising:

a power supply;

an inverter connected to the power supply;

an electric motor connected to the inverter; and wheels driven by the electric motor, the inverter being the inverter according to claim 17.

* * * * *